United States Patent Office

3,068,220
Patented Dec. 11, 1962

3,068,220
WATER INSOLUBLE CYANOETHYL SUCROSE ETHERS
George P. Touey and Herman E. Davis, Kingsport, Tenn., assignors to Eastman Kodak Company, Rochester, N.Y., a corporation of New Jersey
No Drawing. Filed Apr. 13, 1959, Ser. No. 805,730
2 Claims. (Cl. 260—209)

This invention relates to substantially water insoluble cyanoethyl ethers of sucrose containing 5–7.8 cyanoethyl groups per sucrose molecule and the method of preparing those compounds by reacting upon sucrose with acrylonitrile in the presence of a strongly basic catalyst.

One object of our invention is to provide a sucrose derivative, namely, sucrose cyanoethyl ether, wherein at least 5 of the hydroxyl groups of the sucrose are cyanoethylated. Another object of our invention is to provide a simple procedure for preparing such a product. A further object of our invention is to provide a highly substituted sucrose ether having utility as a plasticizer or a plasticizer extender for cellulose derivatives, vinyl polymers, and condensation polymers. Further objects of our invention will appear herein.

We have found that the cyanoethyl ethers of sucrose having 5–7.8 cyanoethyl groups per sucrose molecule are non-volatile, viscous, colorless liquids substantially insoluble in water and are highly compatible with various plastic materials such as cellulose acetate, cellulose acetate butyrate, cellulose nitrate, cellulose propionate and non-cellulosic materials such as vinyl and polyester type film and plastic base materials. We have found when incorporated in the above-mentioned film and plastic materials these cyanoethyl ethers have excellent permanent properties and function both as plasticizers and as plasticizer extenders. These sucrose ethers can be incorporated into film and plastic formulations in amounts up to as high as 50–75% of the composition producing products free of tackiness and having excellent strength. These sucrose cyanoethyl ethers have been found to greatly improve the tensile strength and hardness of cellulosic films, such as those made from cellulose nitrate.

We have found that the cyanoethyl ethers within the scope of our invention may be prepared by mixing together sucrose and acrylonitrile in the presence of a strongly basic catalyst at 30–70° C., until at least 5 hydroxyl groups of the sucrose molecule have been replaced by cyanoethyl groups. As the reaction medium one can employ water or an inert organic solvent such as pyridine, dimethyl formamide, dimethylsulfoxide, dimethylacetamide and N-methyl-2-pyrrolidone or the like. Any strongly basic catalyst known in the art to be a cyanoethylation catalyst can be employed. Typical catalysts which are useful in preparing cyanoethyl sucrose in accordance with our invention are alkali metal hydroxides such as of sodium, potassium, lithium or calcium, quaternary ammonium hydroxides or alkali metal alkoxides such as sodium or potassium methylate. Caustic sodium or potash is preferred as the catalyst. Although the reaction in accordance with our procedure can take place within the temperature range of 10–80° C., we have found that ordinarily a 30–70° C. temperature is most satisfactory. The use of high temperatures should be avoided to prevent considerable polymerization of the acrylonitrile. A temperature below 10° C. extends the reaction time unduly and for practical purposes it is preferred to employ a temperature of at least 10° C. and preferably at least 30° C. The cyanoethylation of sucrose in accordance with our invention is exothermic and, hence, it is sometimes desirable to employ cooling at the start of the reaction.

Cyanoethylation of sucrose may be carried out under the conditions set forth above to obtain a yield of cyanoethylated sucrose in excess of 90%. As cyanoethylated sucrose is a viscous nonvolatile liquid, volatile material may be removed from the reaction mixture by distillation under reduced pressure after having first neutralized the catalyst. To remove salts and other impurities the viscous product can be dissolved in a suitable organic solvent such as acetone, the salts and impurities are removed by filtering and the solvent is removed by distillation. Solvents particularly useful in this connection are ketones and chlorinated hydrocarbons.

In the making of cyanoethyl ethers of sucrose in accordance with our invention, there should be used at least five moles of acrylonitrile per mole of sucrose. The upper limit of the proportion of acrylonitrile to employ is not critical. In view of the number of available hydroxyls in the sucrose, there should be no need to employ more than 12 moles of acrylonitrile per mole of sucrose, even though the use of excess acrylonitrile need not be avoided.

The following examples illustrate our invention:

*Example 1*

A solution of 136 g. (0.4 mole) of sucrose in 140 ml. of water was mixed with 6 ml. of a 40% aqueous potassium hydroxide solution and 176 g. (3.32 moles) of acrylonitrile. The mixture was stirred rapidly for 1 hour at room temperature and was then slowly heated to 60° C. The stirring was continued for 90 minutes while maintaining the 60° C. temperature. A clear, water white, homogeneous solution resulted. The pH was adjusted to 6.8 with dilute hydrochloric acid. The water and excess acrylonitrile were removed by distillation on the steam bath under reduced pressure (2–5 mm. Hg). The syrupy residue obtained was dissolved in acetone and filtered. The acetone was distilled off from the filtrate under reduced pressure (2–5 mm. Hg) leaving 280 g. of viscous, water white, heptacynanoethyl sucrose. This amounted to a yield of 98% of theoretical. Analysis indicated a nitrogen content of 13.9% and a hydroxyl content of 2.5% (1 residual hydroxyl group per sucrose unit). The cyanoethyl sucrose obtained was water insoluble but soluble in acetone and chlorinated hydrocarbons.

*Example 2*

A solution of 342 g. (1 mole) of sucrose in 350 g. of aqueous 10% potassium hydroxide was warmed to 40° C. and 446 grams (8.4 moles) of acrylonitrile was slowly added thereto over a 1 hour period. The mass was vigorously stirred and occasional cooling with ice water kept the temperature at 40°±3° C. After the acrylonitrile had all been added the reaction mixture was then cooled to 20° C. with an ice bath and 1000 ml. of 1,2-dichloroethane was added. The water layer was withdrawn and the mass was washed with two 75 ml. portions of 1,2-dichloroethane. The dichloroethane portions were combined and washed with 500 ml. of water containing enough acetic acid to neutralize the alkali therein. The organic solvent layer was dried over 50 grams of sodium sulfate, filtered and was concentrated by distilling off the dichloroethane under reduced pressure. It was finally heated at 90° C. under 1 mm. pressure for 30 minutes. There was thus obtained 706 grams of a viscous, water white liquid consisting of cyanoethyl sucrose. Analysis of the product indicated a nitrogen content of 13.6% and a hydroxyl content of 2.8% (1.2 residual hydroxyl groups per sucrose units).

*Example 3*

34.2 grams (0.1 mole) of sucrose and 3 ml. of aqueous 40% KOH solution was dissolved in 100 ml. of dimethylformamide and the mixture was slowly heated to 60° C.

80 grams (1.5 moles) of acrylonitrile were added over 3¼ hours while maintaining the 60° C. temperature, accompanied by stirring. The reaction was continued for ½ hour after the acrylonitrile had all been added and then was cooled to room temperature. The alkali present was neutralized by adding dilute acetic acid to the mass. The low boiling material in the mass was removed by distillation under reduced pressure leaving a viscous grainy residue. The product was extracted from the residue with two 250 ml. portions of hot 1,2-dichloroethane. The 1,2-dichloroethane was removed from the extract by distillation under reduced pressure, finally, heating at 90° C. under 2 mm. pressure to give 70 grams of a product similar to that described in the proceeding examples. The hydroxyl content was 1.7% indicating 0.75 hydroxyl groups per sucrose unit.

*Example 4*

Blends of heptacyanoethyl sucrose (as prepared in Example 1) were prepared with various cellulose esters. Films were cast from a mixture consisting of 20 parts of heptacyanoethyl sucrose in 100 parts of solution A. A film cast from a mixture of 20 parts of a 1:1 castor oil-dioctyl phthalate mixture and 100 parts of solution A was used as a control. Similar films were cast from solution B but using as a control a film cast from solution B without additives.

Solution A:                             Parts
  ½ sec. R.S. nitrocellulose _____ 20
  Toluene _____ 12
  95% ethanol _____ 12
  Butyl acetate _____ 32
  Methyl ethyl ketone _____ 24
                                           ---
                                           100

Solution B:                             Parts
  Cellulose acetate _____ 12
  Toluene _____ 8.8
  95% ethanol _____ 10.6
  Acetone _____ 55.4
  Diacetone alcohol _____ 13.2
                                           -----
                                           100.0

The sward hardness, tensile strength, elongation and plasticizer loss on heating of the products prepared with solution A were determined as follows:

TABLE 1

| Composition | Sward Hardness | Tensile Strength, p.s.i. | Elongation, Percent | Plasticizer Loss,[1] Percent |
|---|---|---|---|---|
| 20 parts heptacyanoethyl-sucrose, 100 parts solution A | 66 | 4,040 | 25 | 14.8 |
| 20 parts 50/50 castor oil-dioctylphthalate, 100 parts solution A | 18 | 908 | 41 | 57.8 |

[1] Heated for 72 hours at 220° F.

The tensile strength, elongation, sward hardness and plasticizer loss of the products of solution B were determined as follows:

TABLE 2

| Composition | Sward Hardness | Tensile Strength, p.s.i. | Elongation, Percent | Plasticizer Loss,[1] Percent |
|---|---|---|---|---|
| 20 parts heptacyano-ethyl sucrose, 100 parts solution B | 62 | 5,052 | 10 | 10.0 |
| control (solution B) | 62 | 4,462 | 5 |  |

[1] Heated for 72 hours at 220° F.

We claim:
1. A water insoluble cyanoethyl ether of sucrose having 5–7.8 cyanoethyl groups per sucrose molecule.
2. Water insoluble heptacyanoethyl sucrose.

References Cited in the file of this patent

UNITED STATES PATENTS

| | | |
|---|---|---|
| 2,037,740 | Salzberg | Apr. 21, 1936 |
| 2,189,338 | Bass | Feb. 6, 1940 |
| 2,331,090 | Gabel et al. | Oct. 5, 1943 |
| 2,375,847 | Houtz | May 15, 1945 |
| 2,383,443 | Bruson | Aug. 28, 1945 |
| 2,461,502 | Moe | Feb. 8, 1949 |
| 2,562,884 | Barham | Aug. 7, 1951 |
| 2,563,526 | Gaver et al. | Aug. 7, 1951 |
| 2,671,779 | Gaver et al. | Mar. 9, 1954 |
| 2,842,541 | Journeay | July 8, 1958 |

OTHER REFERENCES

British Rayon and Silk Journal: Article entitled "New Family of Rayons," by Somers, vol. 26, No. 312, May 1950, pages 62, 63 and 68.